US011995448B1

United States Patent
Sodani et al.

(10) Patent No.: US 11,995,448 B1
(45) Date of Patent: May 28, 2024

(54) METHOD AND APPARATUS FOR PERFORMING MACHINE LEARNING OPERATIONS IN PARALLEL ON MACHINE LEARNING HARDWARE

(71) Applicant: Marvell Asia Pte Ltd, Singapore (SG)

(72) Inventors: Avinash Sodani, San Jose, CA (US); Ulf Hanebutte, Gig Harbor, WA (US); Chien-Chun Chou, Morgan Hill, CA (US); Harri Hakkarainen, Los Gatos, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/511,111

(22) Filed: Oct. 26, 2021

Related U.S. Application Data

(63) Continuation-in-part of application No. 17/248,045, filed on Jan. 6, 2021, which is a continuation of
(Continued)

(51) Int. Cl.
*G06F 8/41* (2018.01)
*G06F 9/30* (2018.01)
(Continued)

(52) U.S. Cl.
CPC .............. *G06F 9/3879* (2013.01); *G06F 8/45* (2013.01); *G06F 8/453* (2013.01);
(Continued)

(58) Field of Classification Search
None
See application file for complete search history.

(56) References Cited

U.S. PATENT DOCUMENTS 4,982,291 A * 1/1991 Kurahashi .............. G11B 33/10
386/358
5,329,611 A * 7/1994 Pechanek ................. G06N 3/10
706/42
(Continued)

FOREIGN PATENT DOCUMENTS

GB 2604142 A 8/2022
KR 20210052188 A * 7/2020
(Continued)

OTHER PUBLICATIONS

Ceze, L., et al. Colorama: Architectural Support for Data-Centric Synchronization, 2007, IEEE, pp. 134-144 (Year: 2007).
(Continued)

*Primary Examiner* — Philip Wang

(57) ABSTRACT

A method includes receiving a first set of data. The method also includes receiving an instruction to determine a largest value within the first set of data. The first set of data is divided into a first plurality of data portions based on a hardware architecture of a first plurality of processing elements. The first plurality of data portions is mapped to the first plurality of processing elements. Each data portion of the first plurality of data portions is mapped exclusively to a processing element of the first plurality of processing elements. Each data portion of the first plurality of data portions is processed by its respective processing element to identify a largest value from each data portion of the first plurality of data portions, wherein the processing forms a first output data comprising the largest value from the each data portion of the first plurality of data portions.

36 Claims, 5 Drawing Sheets

Related U.S. Application Data application No. 16/226,508, filed on Dec. 19, 2018, now Pat. No. 11,086,633.

(60) Provisional application No. 63/105,861, filed on Oct. 26, 2020, provisional application No. 62/675,076, filed on May 22, 2018, provisional application No. 62/644,352, filed on Mar. 16, 2018, provisional application No. 62/628,130, filed on Feb. 8, 2018.

(51) Int. Cl.
| | | |
|---|---|---|
| *G06F 9/38* | (2018.01) | |
| *G06F 15/78* | (2006.01) | |
| *G06F 17/16* | (2006.01) | |
| *G06N 20/00* | (2019.01) | |
| *G06N 20/10* | (2019.01) | |
| *G06F 15/80* | (2006.01) | |
| *G06N 5/04* | (2023.01) | |
| *G06N 20/20* | (2019.01) | |

(52) U.S. Cl.
CPC ........ *G06F 9/30174* (2013.01); *G06F 9/3836* (2013.01); *G06F 9/3851* (2013.01); *G06F 9/3877* (2013.01); *G06F 15/7807* (2013.01); *G06F 17/16* (2013.01); *G06N 20/00* (2019.01); *G06N 20/10* (2019.01); *G06F 9/3001* (2013.01); *G06F 15/7864* (2013.01); *G06F 15/8023* (2013.01); *G06F 2212/602* (2013.01); *G06N 5/04* (2013.01); *G06N 20/20* (2019.01)

(56) References Cited

U.S. PATENT DOCUMENTS

| | | | |
|---|---|---|---|
| 5,481,487 A | 1/1996 | Jang et al. | |
| 5,948,098 A | 9/1999 | Leung et al. | |
| 6,415,377 B1 | 7/2002 | Wolf et al. | |
| 6,640,262 B1 | 10/2003 | Uppunda et al. | |
| 7,089,380 B1 | 8/2006 | Schober | |
| 7,191,163 B2 | 3/2007 | Herrera et al. | |
| 7,509,363 B2 | 3/2009 | Clifton | |
| 7,809,663 B1 | 10/2010 | Birch et al. | |
| 7,840,914 B1 | 11/2010 | Agarwal et al. | |
| 7,853,752 B1 | 12/2010 | Agarwal et al. | |
| 7,912,883 B2 | 3/2011 | Hussain | |
| 8,200,728 B2 | 6/2012 | Michaels et al. | |
| 8,209,703 B2 | 6/2012 | Yee et al. | |
| 8,738,860 B1 * | 5/2014 | Griffin ................ | G06F 12/0897 711/122 |
| 9,954,771 B1 | 4/2018 | Levy et al. | |
| 10,161,786 B2 | 12/2018 | Chang et al. | |
| 10,296,556 B2 * | 5/2019 | Zhou ................ | G06F 17/16 |
| 10,305,766 B1 * | 5/2019 | Zhang ................ | G06N 3/044 |
| 10,884,736 B1 * | 1/2021 | Farooqui ............ | G06F 9/30141 |
| 11,016,801 B1 | 5/2021 | Sodani et al. | |
| 11,604,799 B1 * | 3/2023 | Bigdelu ............. | G06F 3/0484 |
| 2003/0163671 A1 | 8/2003 | Gschwind et al. | |
| 2004/0153501 A1 | 8/2004 | Yamashita et al. | |
| 2007/0122347 A1 * | 5/2007 | Statnikov ............ | G16B 40/00 424/9.341 |
| 2008/0040577 A1 | 2/2008 | Nemirovsky et al. | |
| 2009/0097480 A1 * | 4/2009 | Curtis ................ | H04L 69/16 370/389 |
| 2009/0158005 A1 | 6/2009 | Carmichael | |
| 2010/0017420 A1 | 1/2010 | Archer et al. | |
| 2011/0219208 A1 | 9/2011 | Asaad et al. | |
| 2011/0307890 A1 | 12/2011 | Achilles et al. | |
| 2013/0101035 A1 | 4/2013 | Wang et al. | |
| 2013/0117521 A1 | 5/2013 | Li et al. | |
| 2014/0007098 A1 | 1/2014 | Stillwell, Jr. et al. | |
| 2015/0019836 A1 * | 1/2015 | Anderson ........... | G06F 9/30036 712/3 |
| 2015/0046753 A1 | 2/2015 | Cecka et al. | |
| 2015/0106568 A1 | 4/2015 | Feldman et al. | |
| 2015/0309808 A1 | 10/2015 | Nandy et al. | |
| 2015/0347012 A1 | 12/2015 | Dewitt et al. | |
| 2016/0132272 A1 * | 5/2016 | Iwashita ............. | G06F 8/453 711/114 |
| 2016/0162402 A1 | 6/2016 | Woolley, Jr. et al. | |
| 2016/0170916 A1 | 6/2016 | Deshpande et al. | |
| 2016/0224465 A1 * | 8/2016 | Morad ............. | G06F 9/3887 |
| 2017/0068571 A1 | 3/2017 | Lu et al. | |
| 2017/0083313 A1 | 3/2017 | Sankaralingam et al. | |
| 2017/0353397 A1 * | 12/2017 | Che ............. | G06F 9/5088 |
| 2017/0357483 A1 | 12/2017 | Nicol et al. | |
| 2017/0364694 A1 | 12/2017 | Jacob et al. | |
| 2018/0047126 A1 | 2/2018 | Falkenstern et al. | |
| 2018/0068019 A1 | 3/2018 | Novikoff et al. | |
| 2018/0300617 A1 * | 10/2018 | McBride ............. | G06F 9/46 |
| 2018/0341484 A1 | 11/2018 | Fowers et al. | |
| 2018/0349388 A1 | 12/2018 | Skiles et al. | |
| 2019/0121641 A1 | 4/2019 | Knowles et al. | |
| 2019/0121679 A1 | 4/2019 | Wilkinson et al. | |
| 2019/0146455 A1 | 5/2019 | Beylkin et al. | |
| 2019/0147471 A1 * | 5/2019 | McKelvey, Jr. ... | G06Q 30/0255 705/14.1 |
| 2019/0138210 A1 | 11/2019 | Lindholm | |
| 2021/0158155 A1 | 5/2021 | Zhang et al. | |
| 2021/0216874 A1 * | 7/2021 | Jegou ............. | G06N 3/08 |
| 2021/0319317 A1 | 10/2021 | Power et al. | |
| 2021/0390076 A1 * | 12/2021 | Fang ............. | G06F 13/1668 |
| 2022/0067513 A1 | 3/2022 | Stevens et al. | |
| 2022/0076110 A1 | 3/2022 | Shao et al. | |
| 2022/0207783 A1 | 6/2022 | Kwong et al. | |
| 2022/0261650 A1 | 8/2022 | Zhao et al. | |
| 2022/0405566 A1 | 12/2022 | Winterbottom et al. | |
| 2023/0024035 A1 * | 1/2023 | Thuerck ............. | G06F 15/8046 |
| 2023/0071931 A1 * | 3/2023 | Huang ............. | H04L 5/0091 |
| 2023/0106651 A1 | 4/2023 | Xi et al. | |
| 2023/0252275 A1 | 8/2023 | Nez et al. | |

FOREIGN PATENT DOCUMENTS

| | | | |
|---|---|---|---|
| WO | 0245385 A2 | 6/2002 | |
| WO | WO-2018222904 A1 * | 12/2018 | ............. G06F 17/16 |

OTHER PUBLICATIONS

Brewer, "Instructions Set Innovations for the Convey HC-1 Computer", 2010, pp. 70-79, Year: 2010.

Seng, et al. "Reducing Power with Dynamic Critical Path Information", Jan. 1999, pp. 114-123; Year: 1999.

Gelado, et al., "An Asymmetric Distributed Shared Memory Model for Heterogeneous Parallel Systems", 2010 (Year: 2010) 12 pages.

\* cited by examiner

METHOD AND APPARATUS FOR PERFORMING MACHINE LEARNING OPERATIONS IN PARALLEL ON MACHINE LEARNING HARDWARE

CROSS-REFERENCE TO RELATED APPLICATIONS

This application claims the benefit and priority to U.S. Provisional Patent Application No. 63/105,861, filed Oct. 26, 2020, and entitled "METHOD AND APPARATUS FOR PERFORMING ARGMAX OPERATIONS IN PARALLEL ON MACHINE LEARNING HARDWARE," which is incorporated herein in its entirety by reference.

This application is a continuation-in-part patent application and claims the benefit and priority to U.S. patent application Ser. No. 17/248,045, filed Jan. 6, 2021, entitled "INSTRUCTION SET ARCHITECTURE (ISA) FORMAT FOR MULTIPLE INSTRUCTION SET ARCHITECTURES IN MACHINE LEARNING INFERENCE ENGINE," which is a continuation application of U.S. patent application Ser. No. 16/226,508, filed Dec. 19, 2018, which claims the benefit and priority to U.S. Provisional Patent Application No. 62/628,130 filed on Feb. 8, 2018, U.S. Provisional Patent Application No. 62/644,352 filed on Mar. 16, 2018, and U.S. Provisional Patent Application No. 62/675,076 filed on May 22, 2018, all of which are incorporated herein by reference in their entirety.

BACKGROUND

Electronic devices have become an integral part of daily life. Many electronic applications utilize ranking of results using a TopK operation. For example, in one particular application in machine learning (ML), a TopK operation is used to identify the top K indices or entries with the highest probabilities among a large set of data entries, e.g., classifying an image among thousands of classes. TopK operation has also become a common operator in other applications, such as ad-hoc search and retrieval in relational databases, document, and multimedia databases, etc.

A special case of TopK operation is the ArgMax operation, in which K is set equal to one, to identify the largest data value and its index. To perform an ArgMax operation, elements in a vector are compared to one another to identify the largest value and the index location associated with the largest value. The amount of data being processed has increased substantially in recent years, given the increase in ML applications as well as the increase in the amount of data being exchanged. Unfortunately, conventional systems utilize a single processor (element) to process large amount of data, resulting in large delays and slower processing speed for the ArgMax operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
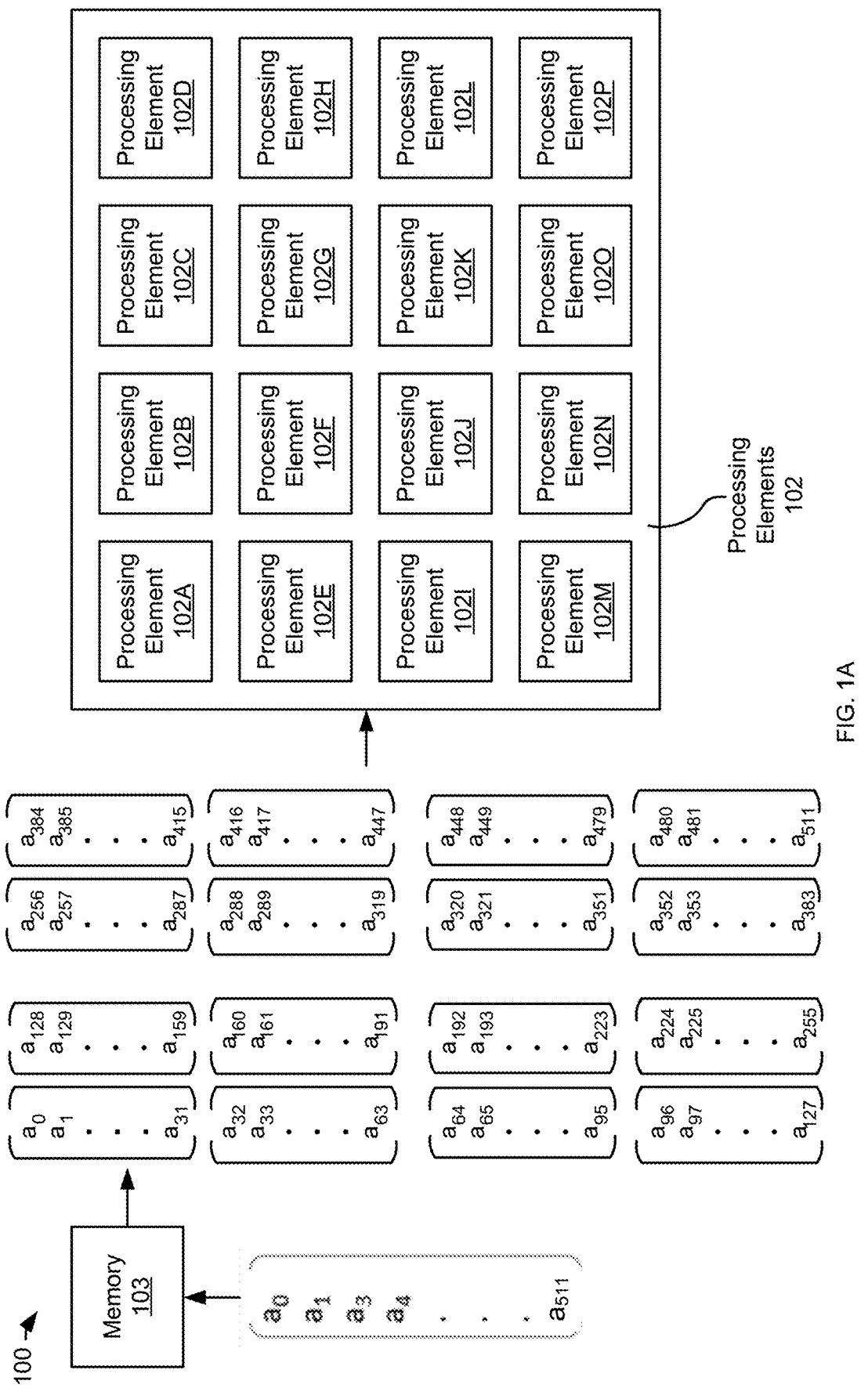
FIG. 1A-1D depict examples of parallel processing of a TopK operation according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

As discussed, the TopK operation (and its special case (i.e., ArgMax) where K has a value 1 to identify the largest value and its index) has become prevalent for ranking results in various applications, such as ML applications. Unfortunately, TopK operation has traditionally been implemented in an inefficient and wasteful manner using a single processing element.

Accordingly, a need has arisen to reduce processing time by leveraging a multi-core architecture of an ML hardware with multiple processing elements. It is appreciated that the embodiments are described with respect to the special case where K is equal to one (i.e., ArgMax) to identify the largest value and its index value for illustration purposes and should not be construed as limiting the scope of the embodiments. As such, it is appreciated that a similar process may be used to identify the top K values and their respective index values. It is further appreciated that an instruction set architecture (ISA) associated with the ML hardware may be used by the compiler to more efficiently implement the ArgMax operation on the ML hardware. It is appreciated that the compiler may generate a lower level code, e.g., in binary format, executable by the ML hardware from a higher level code.

In general, an ArgMax operation identifies the largest value of a vector and its index. For illustrative purposes, a vector data may be V=[100, 2, 101, 53, 33, 53, 67, 94] and it may have eight elements. An ArgMax operation identifies index 2 associated with vector element value 101 as the largest element within the vector. Accordingly, an ArgMax operation may return index 2. It is appreciated that if two elements of the vector data have the same largest value (e.g., if another element within the vector had a value 101) then the index of the first occurrence of the element is taken.

The proposed approach leverages the architecture of a ML hardware-based system that includes a plurality of processing elements to parallel process the ArgMax operation, reducing the amount of processing time. For example, data represented in a vector with n-elements may be divided into m-number of sub-vectors where each sub-vector has k-number (where k is smaller than n) of elements and where each sub-vector is processed by one processing element of the ML hardware. Accordingly, multiple sections (i.e., sub-vector) of the data vector may be simultaneously processed, thereby reducing the processing time. It is appreciated that the global index associated with each element in various sub-vectors are tracked in order, ultimately identify the largest value and its corresponding index in the vector data. It is appreciated that a compiler compiles a higher level code to a lower level code (or executable code on ML hardware). Having knowledge of the ML hardware architecture, the compiler may divide the vector data into sub-vectors and map the sub-vectors to their respective processing elements based on the knowledge of the architecture in order to efficiently execute the instructions.

It is appreciated that ML hardware architecture may include a host, a memory, a core, a data streaming engine, an instruction-streaming engine, and an interference engine. The inference engine includes a plurality of processing elements. The core is configured to interpret a plurality of ML commands/instructions for an ML operation, e.g., TopK, ArgMax, etc., and/or data received from the host, e.g., vector data, and coordinate activities of the streaming and the inference engines based on the data in the received ML commands. The ML operation, e.g., ArgMax, may be compiled into one or more ISA instruction and sent along with its associated data, e.g., sub-vectors, to one or more processing elements of the inference engine for processing.

In some embodiments, the inference engine may include a dense operation engine and an irregular operation engine. The dense operation engine is an engine that is optimized to efficiently process dense data with regular operations, e.g., matrix operations such as multiplication, matrix manipulation, etc. On the other hand the irregular operation engine is an engine that is optimized to efficiently process sporadic data with irregular operations, e.g., memory transpose, addition operation, operations on irregular data structures (such as trees, graphs, and priority queues). In some embodiments, Tanh and Sigmoid operation may be activated by a processing element and executed as a dense operation or irregular operation.

According to some embodiments, the core may coordinate some of the instructions, e.g., TopK, ArgMax, etc., received from the host to be processed. In some embodiments, the core may be a general processor, e.g., a CPU, etc.

Specifically, the core is configured to divide the plurality of ML commands between the core and the inference engine for efficient execution thereof. The ML commands, e.g., TopK, ArgMax, etc., are compiled by the compiler into ISA instructions and the relevant data associated with the ISA instructions are transmitted for execution to the inference engine from the core and the memory to the instruction-streaming engine and the data streaming engine for efficient streaming to the inference engine. The data and instruction steaming engines are configured to send one or more data streams, e.g., data sub-vectors to be operated on by the plurality of processing elements, and ML commands that are compiled, e.g., ISA instructions corresponding to TopK or ArgMax, to the inference engine in response to the received programming instructions from the core.

It is appreciated that, in some embodiments, the ML commands being transmitted from the core to the data/instruction-streaming engines is in a function call format, therefore enabling different processors with different instruction set architectures to be programmed using one type of instruction set architecture. To the core, the operation being performed is a write operation into a memory component, but in reality the operation being done is passing on specific instructions along with their associated data via a function call to the streaming engines for transmission to the inference engine where they can be executed. The inference engine is configured to process the instruction/data streams received from the data/instruction stream engines for the ML operation according to the programming instructions received from the instruction/data streaming engines.

For a non-limiting example, the inference engine may include 64 processing elements (each processing element may further includes a plurality of smaller processing elements PE and POD that are described in application Ser. No. 16/226,508, filed Dec. 19, 2018 that is incorporated herein by reference in its entirety). Each of those processing elements is configured to receive a sub-vector and an instruction (i.e., compiled ArgMax instruction). As such, multiple sub-vectors may be operated on simultaneously, thereby reducing the processing time. For illustrative purposes, it is assumed that the vector data has 128 elements and that there are 64 processing elements where each processing element is configured to process 32 elements. Accordingly, 4 processing elements may receive a sub-vector (each 32 elements as an example) to process a vector data of size 128 elements in parallel while the other 60 processing elements of the inference engine may operate on a different vector or perform a different ML operation altogether. Accordingly, the index associated with the vector with the largest value can be identified.

The proposed ML hardware architecture is highly efficient, flexible and optimized for high-efficiency ML computing while programmable to adapt to the changing environment, usage, applications and algorithms for ML with reduced overhead. By providing hardware support to streamline data/instruction flow, the proposed ML hardware architecture improves system-level performance by significantly reducing the hardware overhead involved in moving data and/or instruction in existing computing architectures. Moreover, the programming instruction set reduces the number of instructions required to perform certain tasks, e.g., processing, moving data, loading data, etc. The proposed ML hardware architecture works well with existing software frameworks and code and may be applied to a wide variety of ML algorithms and neural networks including but not limited to convolution neural network (CNN), recurrent neural network (RNN), gradient boosting machine (GBM), generative adversarial neural network, decision trees, random forest, support vector machine (SVM), clustering, Markov random field (MRF), etc.

FIGS. 1A-1D depict non-limiting examples of parallel processing for a ML operation according to one aspect of the present embodiments. It is appreciated that the described embodiments, as shown in FIGS. 1A-1D, are for illustrative purposes only and should not be construed as limiting the scope of the embodiments. A special case of TopK operation, where K is equal to 1 is illustrated by FIGS. 1A-1D. In other words, the illustrated examples show an ArgMax operation. In this example, data $[a_0, a_1, \ldots, a_{511}]$ are stored in a memory 103 component. An ArgMax instruction is compiled by a compiler and one or more ISA instructions are transmitted to a plurality of processing elements 102. Processing elements 102 may include several processing elements, e.g., processing elements 102A, 102B, . . . , 102P. It is appreciated that 16 processing elements are shown for illustrative purposes and should not be construed as limiting the scope of the embodiments; for example, in some embodiments, 64 processing elements may be used.

In the ML hardware system 100, the processing elements 102 may be an inference engine and are described in application Ser. No. 16/226,508, filed Dec. 19, 2018, which are incorporated herein by reference in its entirety. When the ArgMax operation (i.e., instruction) is compiled by a compiler, one or more ISA instructions along with the associated data are efficiently transmitted to processing elements 102 in order to perform parallel processing.

In this nonlimiting example of system 100, data $[a_0, a_1, \ldots, a_{511}]$ is divided into a plurality of sub-vectors, e.g., $[a_0, a_1, \ldots, a_{31}]$, $[a_{32}, a_{33}, \ldots, a_{63}]$, ..., $[a_{480}, a_{481}, \ldots, a_{511}]$, where each sub-vector can be operated on by its corresponding processing element. It is appreciated that the vector may be divided into sub-vectors in an efficient manner by the compiler having knowledge of the architecture, i.e., architecture of the processing elements 102, for efficient processing thereof. For example, the compiler having knowledge of the ML hardware may determine that each sub-vector should include 32 elements as opposed to 64 elements or 16 elements, etc., such that a localized ArgMax operation can be performed on each sub-vector by its corresponding processing element in an efficient manner to reduce the processing time. As such, vector data $[a_0, a_1, \ldots, a_{511}]$ is divided into 16 sub-vectors and each sub-vector is mapped to a particular processing element of the processing elements 102. It is appreciated that in this example, 16 sub-vectors are generated and mapped to 16 processing elements, thereby enabling parallel processing (simultaneous processing) on all elements at the same time, reducing the processing time. In other words, the 16 processing elements process data simultaneously, each finding the index associated with its largest value, thereby reducing the amount of processing time.

In this nonlimiting example, the first sub-vector $[a_0, a_1, \ldots, a_{31}]$ may be mapped to processing element 102A, the second sub-vector $[a_{32}, a_{33}, \ldots, a_{63}]$ may be mapped to processing element 102B, ..., and the last sub-vector $[a_{480}, a_{481}, \ldots, a_{511}]$ may be mapped to processing element 102P. Each processing element (architecture of which is described in application Ser. No. 16/226,508, filed Dec. 19, 2018 that is incorporated herein by reference in its entirety) may perform an ArgMax operation on its corresponding sub-vector. It is appreciated that the processing elements 102A-102P may process data simultaneously, thereby reducing the processing time. In this example, each processing element returns the largest value (or index associated with the largest value), e.g., 16 values. The output from each processing element may form another vector (in this example 16 elements) and it may be fed back into a processing element to find the largest value or the index associated with the largest value among the 16 elements. It is appreciated that as a result, the ArgMax operation for this illustrative example can be parallel processed in two iterations to return the largest value or its index. Moreover, it is appreciated that if more than one processing element is needed in subsequent iteration (e.g., if one processing element is unable to process all the data in one iteration) then more than one processing element may be used to facilitate parallel processing of the data, reducing the processing time.

It is noteworthy that since the original vector $[a_0, a_1, \ldots, a_{511}]$ was subdivided into a number of sub-vectors and distributed among a plurality of processing elements for parallel processing, the global index associated with each element should be preserved such that the correct index associated with the largest value can be determined as an output. In this example, an offset value may be tracked to preserve the global index. For example, if the first sub-vector $[a_0, a_1, \ldots, a_{31}]$ is mapped to processing element 102A then its offset value is 0 where as the second sub-vector $[a_{32}, a_{33}, \ldots, a_{63}]$ mapped to the processing element 102B has an offset value of 32. Accordingly, when the processing element 102B performs an ArgMax operation on the second sub-vector $[a_{32}, a_{33}, \ldots, a_{63}]$, it generates an index associated with the largest value within that sub-vector where the index is its local index. In order to convert that local index to global index, the output index from the processing element 102B which is its local index is added to the offset value of 32. Similarly, an offset value 64 is tracked for the third sub-vector $[a_{64}, a_{65}, \ldots, a_{95}]$ when it is mapped to processing element 102C. It is appreciated that the offset associated with each sub-vector may be tracked by the processing element it is assigned to. In some embodiments, the offset value for each processing element may be stored within a memory component of the processing element, e.g., on-chip memory (OCM). It is appreciated that in the first iteration one offset value may be stored for each sub-vector, whereas in the second iteration each element may have its own offset value because each element in the second iteration is an output from a different processing element (in an ArgMax operation) and as such a different offset value for each element is tracked.

It is appreciated that the example of FIG. 1A illustrates the data vector being mapped according to the number of processing elements. However, it is appreciated that in some embodiments, the data vector may be mapped according to the number of available processing elements. For example, in the illustrated example above, if 4 out of 16 processing elements are busy with other operations, then the data vector may be divided and mapped to the available processing elements, i.e., the remaining 12 processing elements. As such, the size of the sub-vectors may also be adjusted based on availability of the processing. In this example, if 12 processing elements are available, then the size of the sub-vector may be adjusted from 32 to 16 for example and the number of iterations to perform the ArgMax by the 12 processing elements may be increased.

Figure 1B:
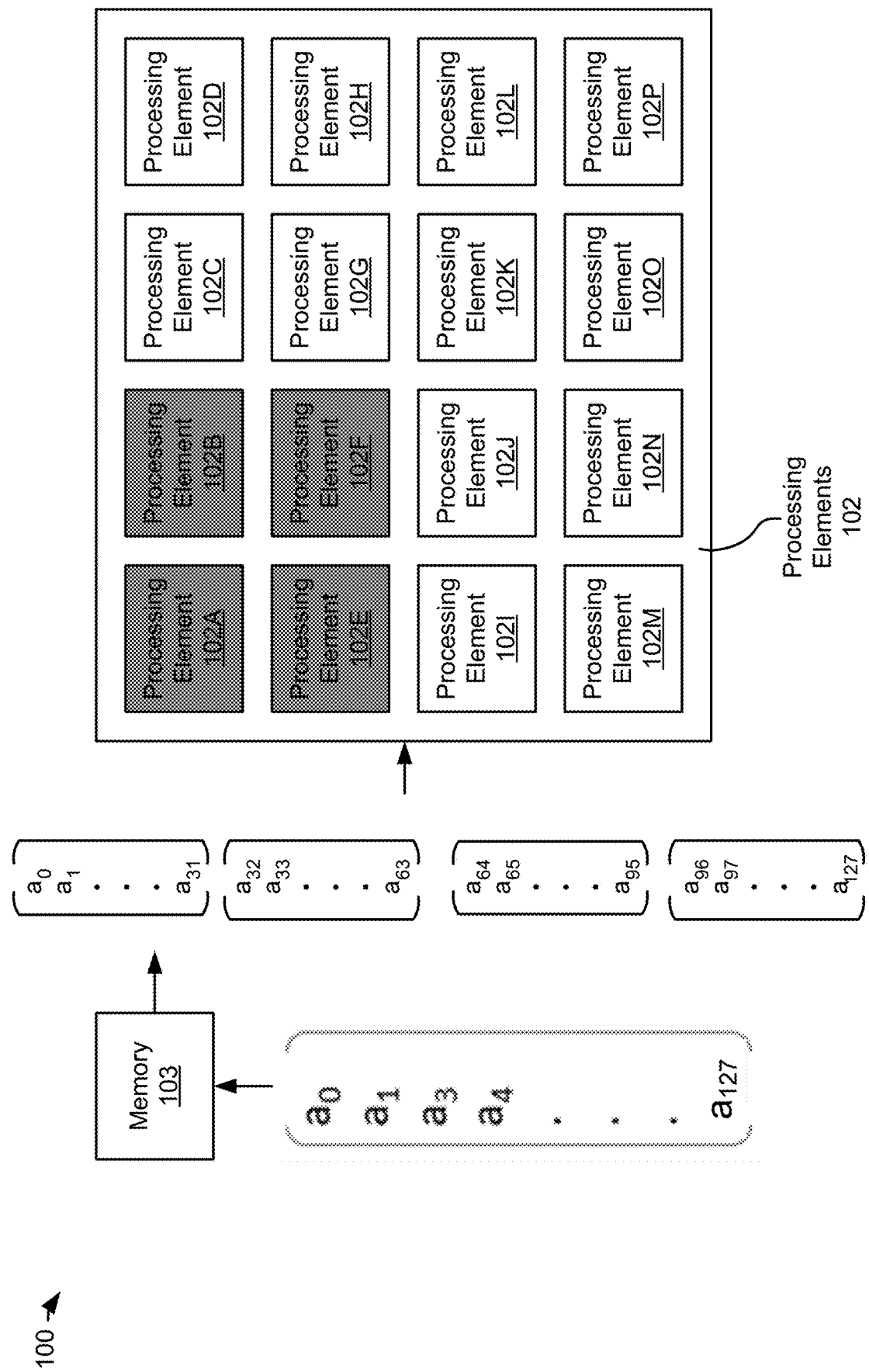

Referring now to FIG. 1B, a similar example to that of FIG. 1A is shown except that the data vector has only 128 elements. The vector data $[a_0, a_1, \ldots, a_{127}]$ is divided into a plurality of sub-vectors based on the number of processing elements and/or available processing elements. In this example, the compiler determines that each sub-vector should be 32 elements, and as such 4 sub-vectors are generated. Each sub-vector is mapped to a particular processing element. In this nonlimiting example, the first sub-vector $[a_0, a_1, \ldots, a_{31}]$ is mapped to processing element 102A, the second sub-vector $[a_{32}, a_{33}, \ldots, a_{63}]$ is mapped to processing 102B, the third sub-vector $[a_{64}, a_{65}, \ldots, a_{95}]$ is mapped to processing 102E, and the fourth sub-vector $[a_{96}, a_{97}, \ldots, a_{127}]$ is mapped to processing 102F. As described above, the offset associated with each sub-vector is tracked in order to track the indices globally. Each processing element performs an ArgMax operation on its respective sub-vector. It is appreciated that the processing element 102A may determine that the index associated with element $a_{27}$ has the largest value within the first sub-vector, the processing element 102B determines that the index associated with element $a_{34}$ has the largest value within the second sub-vector, the processing element 120E determines that the index associated with element $a_{94}$ has the largest value within the third sub-vector, and the processing element 120F determines that the index associated with element $a_{102}$ has the largest value within the fourth sub-vector. The operation of the four processing elements 102A, 102B, 102E, and 102F are tracked and synchronized. Once the indices from each processing element are output, another vector is formed, e.g., [$a_{27}$, $a_{34}$, $a_{94}$, $a_{102}$]. The newly formed vector may be input to one of the four processing elements, 102A, 102B, 102E, 102F to perform an ArgMax operation. However, it is appreciated that another processing element different from the original 4 processing elements, e.g., processing element 102K, may be used. In this example, the processing element 102A is reused to perform an ArgMax operation on the vector [$a_{27}$, $a_{34}$, $a_{94}$, $a_{102}$]. As such, the largest value and its index can be determined which is the largest value and index associated with the original vector data [$a_0$, $a_1$, . . . , $a_{127}$].

Figure 1C:
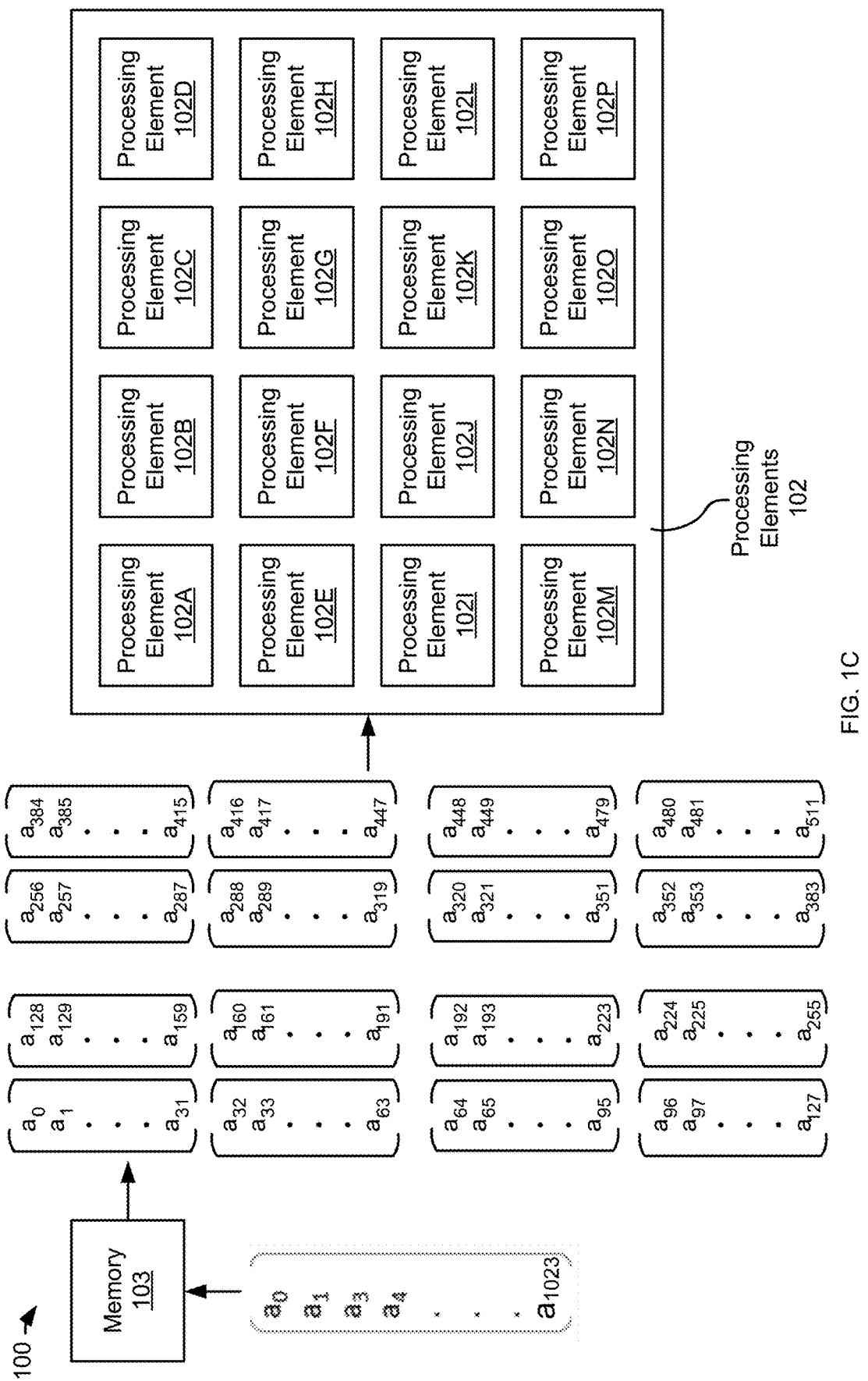

FIG. 1C is similar to FIG. 1A except that the vector data is large, e.g., [$a_0$, $a_1$, . . . , $a_{1023}$]. As such, in this nonlimiting example, the sub-vectors may be the same size as the one in FIG. 1A. Thus, 32 sub-vectors are generated, e.g., [$a_0$, $a_1$, . . . , $a_{31}$], [$a_{32}$, $a_{33}$, . . . , $a_{63}$], . . . , [$a_{991}$, $a_{992}$, . . . , $a_{1023}$]. The first 16 sub-vectors, i.e., [$a_0$, $a_1$, . . . , $a_{31}$], [$a_{32}$, $a_{33}$, . . . , $a_{63}$], . . . , [$a_{480}$, $a_{481}$, . . . , $a_{511}$], are mapped to the available processing elements (e.g., processing elements 102A-120P) and an ArgMax operation is performed on them, as described in FIG. 1A. The output from each processing element is tracked, i.e., 16 outputs corresponding to the largest value or index of the largest value within each sub-vector. However, since the number of processing elements (or available processing elements) in the processing elements 102 could not accommodate parallel processing on all sub-vectors simultaneously, then the second set of 16 sub-vectors, i.e., [$a_{512}$, . . . , $a_{544}$], . . . [$a_{991}$, $a_{992}$, . . . , $a_{1023}$], are mapped to the available processing elements (e.g., processing elements 102A-120P once they are done performing an ArgMax operation on the first 16 sub-vectors). The output from each processing element is tracked, i.e., 16 outputs corresponding to the largest value or index of the largest value within each sub-vector. It is appreciated that the global index is also tracked using an offset as described above. Accordingly, 32 outputs where each correspond to the largest value or index associated with the largest value for each sub-vector are output and forms a new vector. The new vector of 32 elements is then mapped to an available processing element, e.g., processing element 102G, to perform an ArgMax operation. The output from the processing element 102G is the largest value or index associated with the largest value in the vector data [$a_0$, $a_1$, . . . , $a_{1023}$].

Figure 1D:
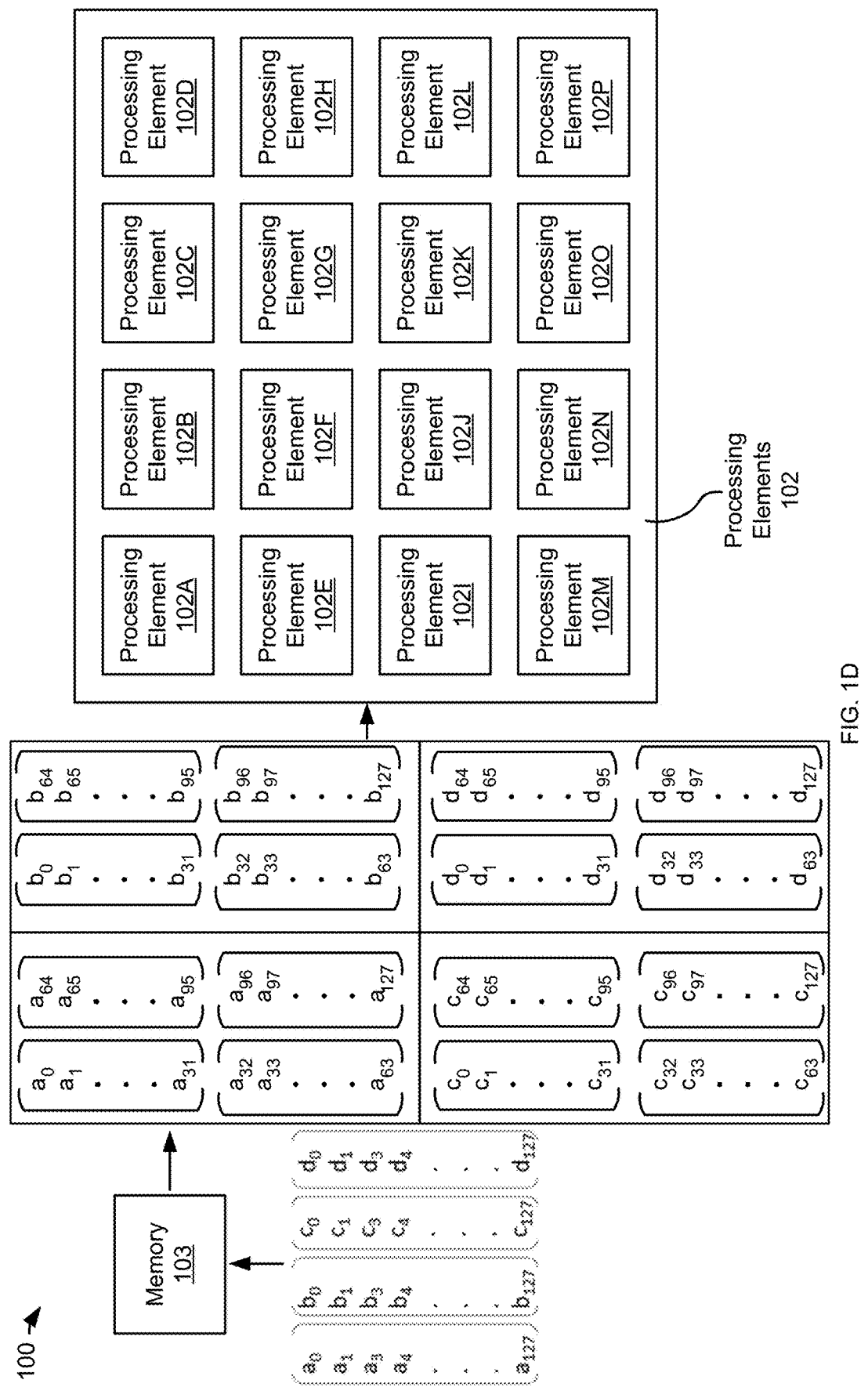

FIG. 1D is similar to that of FIG. 1B except that the data is a tensor, which is a data structure for ML operations, with m (e.g., 4) vectors each of size n (e.g., 128). In this nonlimiting example, each vector of size n is divided into sub-vectors and the sub-vectors are mapped similar to that of FIG. 1B, e.g., each vector is mapped to 4 processing elements. For example, vector [$a_0$, $a_1$, . . . , $a_{127}$] may be subdivided into four sub-vectors [$a_0$, $a_1$, . . . , $a_{31}$], [$a_{32}$, $a_{33}$, . . . , $a_{63}$], . . . , [$a_{96}$, $a_{97}$, . . . , $a_{127}$] and mapped to processing elements 102A, 102B, 102E, and 102F respectively. Similarly, vector [$b_0$, $b_1$, . . . , $b_{127}$] may be subdivided into four sub-vectors [$b_0$, $b_1$, . . . , $b_{31}$], [$b_{32}$, $b_{33}$, . . . , $b_{63}$], . . . , [$b_{96}$, $b_{97}$, . . . , $b_{127}$] and mapped to processing elements 102C, 102D, 102G, and 102H respectively. Vector [$c_0$, $c_1$, . . . , $c_{127}$] may be subdivided into four sub-vectors [$c_0$, $c_1$, . . . , $c_{31}$], [$c_{32}$, $c_{33}$, . . . , $c_{63}$], . . . , [$c_{96}$, $c_{97}$, . . . , $c_{127}$] and mapped to processing elements 102I, 102J, 102M, and 102N respectively. Vector [$d_0$, $d_1$, . . . , $d_{127}$] may be subdivided into four sub-vectors [$d_0$, $d_1$, . . . , $d_{31}$], [$d_{32}$, $d_{33}$, . . . , $d_{63}$], . . . , [$d_{96}$, $d_{97}$, . . . , $d_{127}$] and mapped to processing elements 102K, 102L, 102O, and 102P respectively. It is appreciated that as described in FIG. 1, each processing element performs an ArgMax operation on its sub-vector while tracking the offset to preserve the global indices associated with each element.

In some embodiments, the processing element 102A performs an ArgMax operation on sub-vector [$a_0$, $a_1$, . . . , $a_{31}$], the processing element 102B performs an ArgMax operation on sub-vector [$a_{32}$, $a_{33}$, . . . , $a_{63}$], the processing element 102E performs an ArgMax operation on sub-vector [$a_{64}$, $a_{65}$, . . . , $a_{95}$], the processing element 102F performs an ArgMax operation on sub-vector [$a_{96}$, $a_{97}$, . . . , $a_{127}$]. Accordingly, the processing element 102A outputs the largest value or an index associated with the largest value, e.g., index for element $a_{11}$, the processing element 102B outputs the largest value or an index associated with the largest value, e.g., index for element $a_{45}$, the processing element 102E outputs the largest value or an index associated with the largest value, e.g., index for element $a_{79}$, and the processing element 102F outputs the largest value or an index associated with the largest value, e.g., index for element $a_{126}$. It is appreciated that since each processing element outputs a local index associated with the largest element, an offset value can be used to track the indices globally, as presented above. A new vector containing the largest values or indices associated with the largest values from each of the processing elements 102A, 102B, 102E, and 102F is formed, e.g., [$a_{11}$, $a_{45}$, $a_{79}$, $a_{126}$]. The newly formed vector may be used by an available processing element, e.g., processing element 102B, in a subsequent iteration to perform an ArgMax operation on the newly formed vector [$a_{11}$, $a_{45}$, $a_{79}$, $a_{126}$]. The largest value or index associated with the largest value is therefore determined. It is appreciated that during the second iteration, the offset value of 0 associated with element $a_{11}$ is used, while offset value of 32 is used for $a_{45}$, 64 is used for $a_{79}$, and 96 is used for $a_{126}$ to track the global indices associated with the elements of the newly formed vector [$a_{11}$, $a_{45}$, $a_{79}$, $a_{126}$].

It is appreciated that other vectors of the tensor may be processed similarly, as described above. For example, the processing element 102C performs an ArgMax operation on sub-vector [$b_0$, $b_1$, . . . , $b_{31}$], the processing element 102D performs an ArgMax operation on sub-vector [$b_{32}$, $b_{33}$, . . . , $b_{63}$], the processing element 102G performs an ArgMax operation on sub-vector [$b_{64}$, $b_{65}$, . . . , $b_{95}$], the processing element 102H performs an ArgMax operation on sub-vector [$b_{96}$, $b_{97}$, . . . , $b_{127}$]. Accordingly, the processing element 102C outputs the largest value or an index associated with the largest value, e.g., index for element $b_3$, the processing element 102D outputs the largest value or an index associated with the largest value, e.g., index for element $b_{60}$, the processing element 102G outputs the largest value or an index associated with the largest value, e.g., index for element $b_{83}$, and the processing element 102H outputs the largest value or an index associated with the largest value, e.g., index for element $b_{101}$. It is appreciated that since each processing element outputs a local index associated with the largest element, an offset value can be used to track the indices globally, as presented above. A new vector containing the largest values or indices associated with the largest values from each of the processing elements 102C, 102D, 102G, and 102H is formed, e.g., [$b_3$, $b_{60}$, $b_{83}$, $b_{101}$]. The newly formed vector may be used by an available processing element, e.g., processing element 102H, in a subsequent iteration to perform an ArgMax operation on the newly formed vector [$b_3$, $b_{60}$, $b_{83}$, $b_{101}$]. The largest value or index associated with the largest value is therefore determined. It is appreciated that during the second iteration, the offset value of 0 associated with element $b_3$ is used, while offset value of 32 is used for $b_{60}$, 64 is used for $b_{83}$, and 96 is used for $b_{101}$ to track the global indices associated with the elements of the newly formed vector $[b_3, b_{60}, b_{83}, b_{101}]$.

The processing element 102I performs an ArgMax operation on sub-vector $[c_0, c_1, \ldots, c_{31}]$, the processing element 102J performs an ArgMax operation on sub-vector $[c_{32}, c_{33}, \ldots, c_{63}]$, the processing element 102M performs an ArgMax operation on sub-vector $[c_{64}, c_{65}, \ldots, c_{95}]$, the processing element 102M performs an ArgMax operation on sub-vector $[c_{96}, c_{97}, \ldots, c_{127}]$. Accordingly, the processing element 102I outputs the largest value or an index associated with the largest value, e.g., index for element $c_{23}$, the processing element 102J outputs the largest value or an index associated with the largest value, e.g., index for element $c_{59}$, the processing element 102M outputs the largest value or an index associated with the largest value, e.g., index for element $c_{71}$, and the processing element 102N outputs the largest value or an index associated with the largest value, e.g., index for element $c_{117}$. It is appreciated that each processing element outputs a local index associated with the largest element, an offset value can be used to track the indices globally, as presented above. A new vector containing the largest values or indices associated with the largest values from each of the processing elements 102I, 102J, 102M, and 102N is formed, e.g., $[c_{23}, c_{59}, c_{71}, c_{117}]$. The newly formed vector may be used by an available processing element, e.g., processing element 102N, in a subsequent iteration to perform an ArgMax operation on the newly formed vector $[c_{23}, c_{59}, c_{71}, c_{117}]$. The largest value or index associated with the largest value is therefore determined. It is appreciated that during the second iteration, the offset value of 0 associated with element $c_{23}$ is used, while offset value of 32 is used for $c_{59}$, 64 is used for $c_{71}$, and 96 is used for $c_{117}$ to track the global indices associated with the elements of the newly formed vector $[c_{23}, c_{59}, c_{71}, c_{117}]$.

The processing element 102K performs an ArgMax operation on sub-vector $[d_0, d_1, \ldots, d_{31}]$, the processing element 102L performs an ArgMax operation on sub-vector $[d_{32}, d_{33}, \ldots, d_{63}]$, the processing element 102O performs an ArgMax operation on sub-vector $[d_{64}, d_{65}, \ldots, d_{95}]$, the processing element 102P performs an ArgMax operation on sub-vector $[d_{96}, d_{97}, \ldots, d_{127}]$. Accordingly, the processing element 102K outputs the largest value or an index associated with the largest value, e.g., index for element $d_{29}$, the processing element 102L outputs the largest value or an index associated with the largest value, e.g., index for element $d_{47}$, the processing element 102O outputs the largest value or an index associated with the largest value, e.g., index for element $d_{93}$, and the processing element 102P outputs the largest value or an index associated with the largest value, e.g., index for element $d_{123}$. It is appreciated that since each processing element outputs a local index associated with the largest element, an offset value can be used to track the indices globally, as presented above. A new vector containing the largest values or indices associated with the largest values from each of the processing elements 102K, 102L, 102O, and 102P is formed, e.g., $[d_{29}, d_{47}, d_{93}, d_{123}]$. The newly formed vector may be used by an available processing element, e.g., processing element 102O, in a subsequent iteration to perform an ArgMax operation on the newly formed vector $[d_{29}, d_{47}, d_{93}, d_{123}]$. The largest value or index associated with the largest value is therefore determined. It is appreciated that during the second iteration, the offset value of 0 associated with element $d_{29}$ is used, while offset value of 32 is used for $d_{47}$, 64 is used for $d_{93}$, and 96 is used for $d_{123}$ to track the global indices associated with the elements of the newly formed vector $[d_{29}, d_{47}, d_{93}, d_{123}]$.

It is appreciated that while the above examples are provided within the context of ArgMax operation, the embodiments and the process is not limited thereto. For example, a TopK operation may similarly be performed similar to that described above except that instead of determining/tracking the largest value and/or its index, the top K (i.e., top largest K elements) values and/or their respective indices are identified and tracked. For example, in a TopK operation each processing element outputs the TopK elements of its respective sub-vector. For illustrative purposes, it is presumed that a sub-vector for a first processing element is [10, 8, 6, 2] and a sub-vector for a second processing element is [9, 7, 3, 1] in a Top2 operation. Each processing element outputs its top 2 elements, e.g., [10, 8] from the first processing element and [9, 7] from the second processing element during its first iteration and the Top2 operation during a second iteration outputs [10, 9] which is the correct output.

An illustrative example of an ML library high level code for data exchange after performing the ArgMax operation is illustrated below. In the example below is all to one gather operation for the values and indices while other examples may be all to all data exchange (gather/scatter).

```
int src = 0, dst = 0; // Source and destination base addresses
int K = 8;          // K=8 for Top8
SyncTask_t* sync_task = (SyncTask_t*) malloc(sizeof(SyncTask_t));
sync_task->tilemask = 0xffffffffffffffull;
sync_task->syncbits = 0;
sync_task->set_tag = 0;
sync_task->ins_sync_tag = 0;
MonitorTask_t* monitor_task = (MonitorTask_t*) malloc(sizeof(MonitorTask_t));
monitor_task->startTilePerfCnt = 0;
monitor_task->endPilePerfCnt = 0;
monitor_task->startDODPerfCnt = 0;
monitor_task->endDODPerfCnt = 0;
size = mllib_CopyRemoteAbs(inst_buffer, sync_task, monitor_task, src, dat, K, 0, 0, 1, 0, 0, 1,
0, 0, K, 64};
size += mllib_CopyRemoteAbs(inst_buffertsize, sync_task, monitor_task, src+K, dst+64*K, 2*K, 0,
0, 1, 0, 0, 1, 0, 0, 2*K, 64);
sync_task->syncbits = 3;
size += mllib_Sync(inst_buffertaize, sync_task, monitor_task);
```

It is appreciated that a low level ISA code may be generated from the ML library high level code corresponding to the all to one data exchange operation above, and is shown below as an example.

```
//1
PETaskBest 4 0xffffffffffffffff 0 0 0 0 0 0 0
TileTaskParamUpdUsingTileID 4 3 2 8 0 0 0 0 0 0 64
PELoadStream1 0x0 8 0 1 0 1
PEMove 0x1f 0x1e 8 0 0 1 1 1
PEStoreStream 0x0 8 0 1 0 1 2 0 0
//2
PETaskBest 4 0xffffffffffffffff 0 0 0 0 0 0 0
TileTaskParamUpdUsingTileID 4 3 2 16 0 0 0 0 0 0 64
PELoadStream1 0x8 16 0 1 0 1
PEMove 0x1f 0x1e 16 0 0 1 1 1
PEStoreStream 0x200 16 0 1 0 1 2 0 0
//3
PETaskBest 1 0xffffffffffffffff 3 0 0 0 0 0 0
PESync
```

It is appreciated that utilizing ISA instruction in ML hardware unlike application specific integrated circuit (ASIC), is not only programmable but also leverages ahead of time compilation to efficiently divide the data (e.g., vector data) to be operated on, e.g., TopK, ArgMax, etc., via processing elements in parallel.

Figure 2:
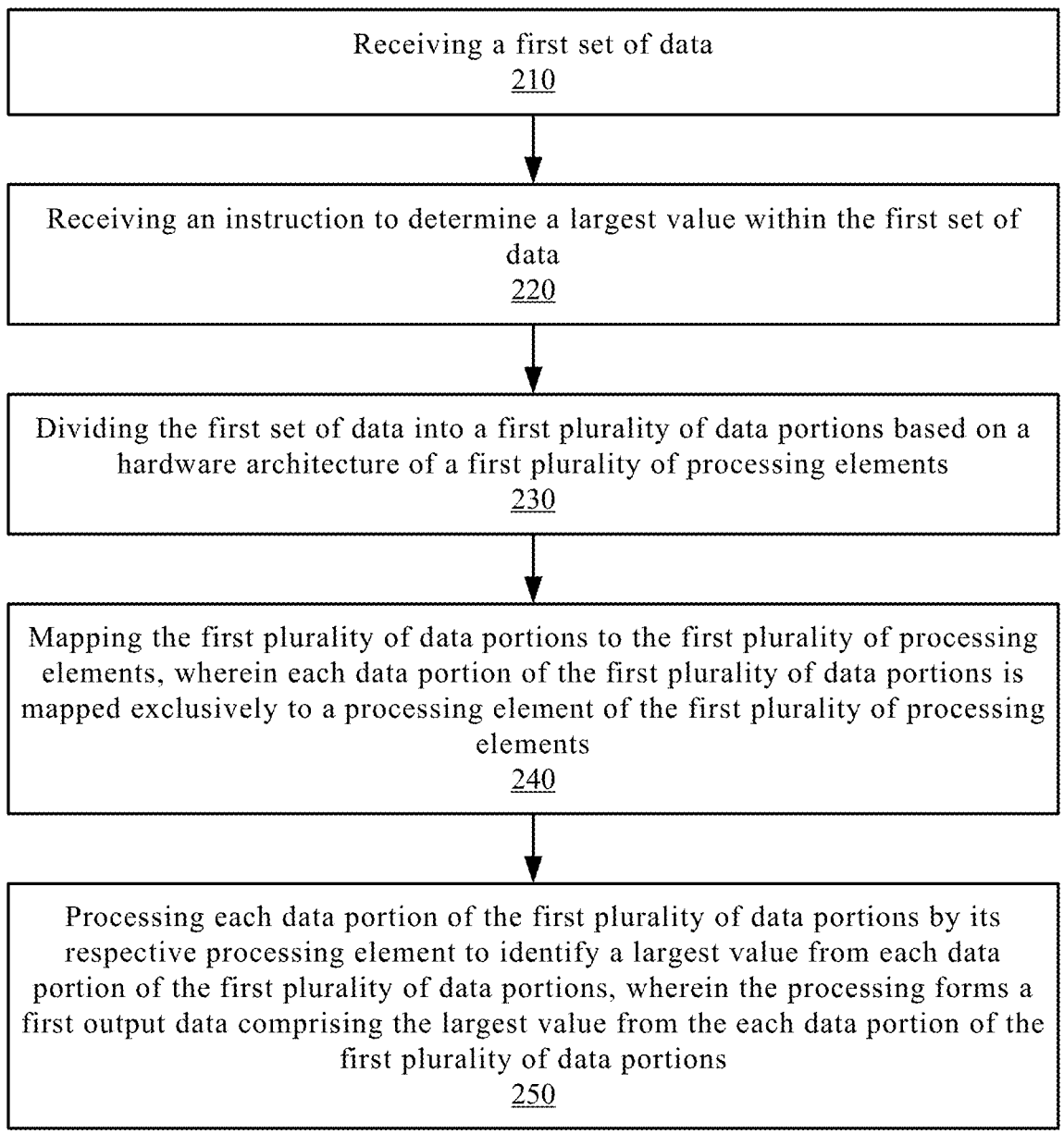
FIG. 2 depicts a flow diagram of parallel processing of a TopK operation according to one aspect of the present embodiments.

FIG. 2 depicts a flow diagram of parallel processing of a ML operation according to one aspect of the present embodiments. At step 210, a first set of data is received, as described in FIGS. 1A-1D. At step 220, an instruction to determine a largest value with the first set of data is received, as described above. At step 230, the first set of data is divided into a first plurality of data portions based on a hardware architecture of a first plurality of processing elements, as discussed in FIGS. 1A-1D. At step 240, the first plurality of data portions is mapped to the first plurality of processing elements, as described above. Each data portion of the first plurality of data portions is mapped exclusively to a processing element of the first plurality of elements. At step 250, each data portion of the first plurality of data portions is processed by its respective processing element to identify a largest value from each data portion, as illustrated in FIGS. 1A-1D. The processing forms a first output data that includes the largest value from each data portion of the first plurality of data portions. It is appreciated that the first output data may be mapped to a processing element in a second iteration of the processing to identify the largest value within the first output data. It is appreciated that a global index associated with each element may be tracked, as described above. It is appreciated that the process of dividing the data into portions and mapping them to the processing elements may be repeated until all data elements of the vector data is processed. The output of the processing elements form new vector data and processed repeatedly as described above until the largest value and/or index associated with the largest value within the vector data is identified.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A computer implemented method, comprising:
receiving a first set of data;
receiving an instruction to determine a largest value within the first set of data;
dividing the first set of data into a first plurality of data portions based on a hardware architecture of a first plurality of processing elements, wherein a size of data portions of the first plurality of data portions changes depending on availability of processing elements of the first plurality of processing elements;
mapping the first plurality of data portions to the first plurality of processing elements, wherein each data portion of the first plurality of data portions is mapped exclusively to a processing element of the first plurality of processing elements; and
processing each data portion of the first plurality of data portions by its respective processing element by executing the instruction to identify a largest value from each data portion of the first plurality of data portions, wherein the processing forms a first output data comprising the largest value from the each data portion of the first plurality of data portions.

2. The computer implemented method of claim 1 further comprising tracking a global index associated with each element of the first plurality of data portions.

3. The computer implemented method of claim 2, wherein each processing element of the first plurality of processing elements outputs a local index and value associated with a largest value.

4. The computer implemented method of claim 3, wherein the tracking comprises using an offset value associated with each data portion of the first plurality of data portions being mapped to respective processing element of the first plurality of processing elements.

5. The computer implemented method of claim 1 further comprising compiling the instruction to at least one or more instruction set architecture (ISA) format.

6. The computer implemented method of claim 1, wherein the mapping is further based on availability of processing elements.

7. The computer implemented method of claim 1, wherein the first plurality of processing elements is a subset of a second plurality of processing elements of the hardware.

8. The computer implemented method of claim 1, wherein the hardware architecture is an inference engine of a machine learning hardware.

9. The computer implemented method of claim 1 further comprising outputting the first output data to a processing element of the hardware to determine a largest value of the first output data, wherein the largest value of the first output data is a same as the largest value of the first set of data.

10. The computer implemented method of claim 9, wherein the processing element that processes the first output data is a processing element selected from the first plurality of processing elements.

11. The computer implemented method of claim 9, wherein the processing element that processes the first output data is a processing element that is different from processing elements of the first plurality of processing elements.

12. The computer implemented method of claim 1, wherein the first set of data is a tensor.

13. The computer implemented method of claim 1, wherein the first plurality of processing elements operate on their respective data portion of the first plurality of data portions in parallel.

14. The computer implemented method of claim 1 further comprising:
receiving a second set of data;
receiving an instruction to determine a largest value within the second set of data;
dividing the second set of data into a second plurality of data portions based on the hardware architecture of a second plurality of processing elements;
mapping the second plurality of data portions to the second plurality of processing elements, wherein each data portion of the second plurality of data portions is mapped exclusively to a processing element of the second plurality of processing elements; and
processing each data portion of the second plurality of data portions by its respective processing element to identify a largest value from each data portion of the second plurality of data portions, wherein the processing forms a second output data comprising the largest value from the each data portion of the second plurality of data portions.

15. The computer implemented method of claim 14, wherein the first plurality of processing elements process the first plurality of data portions and wherein the second plurality of processing elements process the second plurality of data portions in parallel.

16. The computer implemented method of claim 14, wherein the first set of data and the second set of data are parts of a tensor data.

17. The computer implemented method of claim 14 further comprising outputting the second output data to a processing element of the hardware to determine a largest value of the second output data, wherein the largest value of the second output data is a same as the largest value of the second set of data.

18. A system comprising:
a compiler configured to receive an instruction to determine a largest value within a first set of data, and wherein the compiler is further configured to divide the first set of data into a first plurality of data portions based on a hardware architecture of a first plurality of processing elements, wherein a size of data portions of the first plurality of data portions changes depending on availability of processing elements of the first plurality of processing elements, and wherein the compiler is further configured to map the first plurality of data portions to the first plurality of processing elements, wherein each data portion of the first plurality of data portions is mapped exclusively to a processing element of the first plurality of processing elements; and
a second plurality of processing elements comprising the first plurality of processing elements, wherein each processing element of the first plurality of processing elements is configured to process its respective data portion of the first plurality of data portions to identify a largest value from that data portion, wherein the first plurality of processing elements is configured to form a first output data comprising the largest value from the each data portion of the first plurality of data portions.

19. The system of claim 18, wherein each processing element has an on-chip memory (OCM) associated therewith, and wherein a global index associated with each element of the first plurality of data portions is tracked in its respective OCM.

20. The system of claim 19, wherein each processing element of the first plurality of processing elements outputs a local index associated with a largest value.

21. The system of claim 20, wherein the global index is tracked using an offset value associated with each data portion of the first plurality of data portions being mapped to respective processing element of the first plurality of processing elements.

22. The system of claim 18, wherein the compiler is configured to compile the instruction to at least one or more instruction set architecture (ISA) format.

23. The system of claim 18, wherein the compiler is further configured to map based on availability of processing elements.

24. The system of claim 18, wherein the hardware architecture is an inference engine of a machine learning hardware.

25. The system of claim 18, wherein the first plurality of processing elements is configured to output the first output data to a processing element of the hardware to determine a largest value of the first output data, wherein the largest value of the first output data is a same as the largest value of the first set of data.

26. The system of claim 25, wherein the processing element that processes the first output data is a processing element selected from the first plurality of processing elements.

27. The system of claim 25, wherein the processing element that processes the first output data is a processing element that is different from processing elements of the first plurality of processing elements.

28. The system of claim 18, wherein the first set of data is a tensor.

29. The system of claim 18, wherein the first plurality of processing elements operate on their respective data portion of the first plurality of data portions in parallel.

30. The system of claim 18, wherein:
the compiler is further configured to receive an instruction to determine a largest value within a second set of data,
the compiler is further configured to divide the second set of data into a second plurality of data portions based on the hardware architecture of a third plurality of processing elements that is a subset of processing elements within the second plurality of processing elements;
the compiler is further configured to map the second plurality of data portions to the third plurality of processing elements, wherein each data portion of the second plurality of data portions is mapped exclusively to a processing element of the third plurality of processing elements; and
each data portion of the second plurality of data portions is processed by its respective processing element of the third plurality of processing elements to identify a largest value from each data portion of the second plurality of data portions, wherein the processing forms a second output data comprising the largest value from the each data portion of the second plurality of data portions.

31. The system of claim 30, wherein the first plurality of processing elements process the first plurality of data portions and wherein the third plurality of processing elements process the second plurality of data portions in parallel.

32. The system of claim 30, wherein the first set of data and the second set of data are parts of a tensor data.

33. The system of claim 30, wherein the third plurality of processing elements is configured to output the second output data to a processing element of the hardware to determine a largest value of the second output data, wherein the largest value of the second output data is a same as the largest value of the second set of data.

34. The system of claim 18 further comprising a memory configured to store a first set of data.

35. A system comprising:
- a means for receiving a first set of data;
- a means for receiving an instruction to determine a largest value within the first set of data;
- a means for dividing the first set of data into a first plurality of data portions based on a hardware architecture of a first plurality of processing elements, wherein a size of data portions of the first plurality of data portions changes depending on availability of processing elements of the first plurality of processing elements;
- a means for mapping the first plurality of data portions to the first plurality of processing elements, wherein each data portion of the first plurality of data portions is mapped exclusively to a processing element of the first plurality of processing elements; and
- a means for processing each data portion of the first plurality of data portions by its respective processing element to identify a largest value from each data portion of the first plurality of data portions, wherein the means for processing forms a first output data comprising the largest value from the each data portion of the first plurality of data portions.

36. A computer implemented method, comprising:
- receiving a first set of data;
- receiving an instruction to determine a largest value within the first set of data;
- dividing the first set of data into a first plurality of data portions based on a hardware architecture of a first plurality of processing elements, wherein a size or a number components associated with at least one processing element of the first plurality of processing elements is different from another processing element of the first plurality of processing elements;
- mapping the first plurality of data portions to the first plurality of processing elements, wherein each data portion of the first plurality of data portions is mapped exclusively to a processing element of the first plurality of processing elements; and
- processing each data portion of the first plurality of data portions by its respective processing element by executing the instruction to identify a largest value from each data portion of the first plurality of data portions, wherein the processing forms a first output data comprising the largest value from the each data portion of the first plurality of data portions.

* * * * *